United States Patent [19]
Yonehara

[11] Patent Number: 5,228,037
[45] Date of Patent: Jul. 13, 1993

[54] LINE INTERFACE FOR HIGH-SPEED LINE

[75] Inventor: Akifumi Yonehara, Tokyo, Japan

[73] Assignee: NEC Corporation, Tokyo, Japan

[21] Appl. No.: 675,734

[22] Filed: Mar. 27, 1991

[30] Foreign Application Priority Data

Mar. 27, 1990 [JP] Japan .................................. 2-78011

[51] Int. Cl.$^5$ .............................................. H04J 3/06
[52] U.S. Cl. .................................. 370/105.1; 375/114;
375/116
[58] Field of Search ............... 370/105, 105.1, 105.2,
370/105.3, 105.4, 105.5, 106, 108, 110.1, 100.1;
375/116, 114, 111, 118

[56] References Cited

U.S. PATENT DOCUMENTS

| | | | |
|---|---|---|---|
| 4,860,283 | 8/1989 | Takano et al. | 370/105 |
| 4,860,323 | 8/1989 | Malter | 370/105.1 |
| 4,910,754 | 3/1990 | Allen et al. | 375/116 |
| 5,007,088 | 4/1991 | Ooi et al. | 370/105.1 |
| 5,010,559 | 4/1991 | O'Connor et al. | 370/105 |
| 5,033,044 | 7/1991 | Williams et al. | 370/105.1 |
| 5,063,564 | 11/1991 | Crandall et al. | 370/105.1 |

Primary Examiner—Douglas W. Olms
Assistant Examiner—Dang Ton
Attorney, Agent, or Firm—Whitham & Marhoefer

[57] ABSTRACT

A line interface for high-speed line capable of detecting not only errors occurred on the line but also errors occurred in itself. A first multiplex cifcuit multiplexes a transmission frame synchronizing (sync) signal with data to be transmitted to the line and sends the multiplexed signal as a signal to be transmitted. A second multiplex circuit multiplexes the signal to be transmitted with a signal received from the line. A frame sync circuit synchronizes in phase to both of the received signal and signal to be transmitted multiplexed by the second multiplex circuit and, when not failed to synchronize, outputs a frame error signal. A demultiplex circuit separates data to be transmitted and received data from the output signal of the second multiplex circuit. A pattern comparator compares the data to be transmitted outputted by the demultiplex circuit and the data to be transmitted fed to the first multiplex circuit and, if they are not identical, produces a data non-coincidence signal.

20 Claims, 4 Drawing Sheets

LINE INTERFACE FOR HIGH-SPEED LINE

BACKGROUND OF THE INVENTION

1. Field of the Invention

The present invention relates to a line interface for a high-speed line and, more particularly, to a line interface applicable to the high-speed side of multiplex equipment which is included in a data transmission system.

2. Description of the Prior Art

In a data transmission system, multiplex equipment converts data to be transmitted over a plurality of low-speed lines and data to be transmitted over a plurality of high-speed lines to each other. Data coming in over each low-speed line is received by a particular low-speed line interface assigned to the low-speed line and applied to a multiplex-demultiplex circuit. The data applied to the multiplex-demultiplex circuit from the respective low-speed line interfaces are rearranged and sent out to high-speed lines by high-speed line interfaces each being associated with respective one of the high-speed lines. On the other hand, data received by the high-speed line interfaces and fed to the multiplex-demultiplex circuit are rearranged and sent out to the low-speed lines by the low-speed line interfaces each being associated with respective one of the low-speed lines.

The high-speed line interfaces each receives data to be transmitted to corresponding one of the high-speed lines from the multiplex-demultiplex circuit, multiplexes a transmission frame synchronizing (sync) signal with the data, and then sends the multiplexed signal to be transmitted to the high-speed line. When the high-speed line interface receives a multiplexed signal of received data and reception frame sync signal from corresponding one of the high-speed lines, it removes the frame sync signal from the received signal and transfers the received data to the multiplex-demultiplex circuit.

To remove the reception frame sync signal from the received signal, timing information of the sync signal is essential. The high-speed line interface obtains such timing signal by a frame sync circuit frame-synchronous to received signals incorporated therein. The frame sync circuit also functions to detect errors on the associated high-speed line by monitoring received signals. Specifically, when the frame sync circuit cannot set up frame synchronization to a received signal, it generates a frame error signal to report an error occurred on the high-speed line. The frame error signal is used as a trigger for replacing the defective high-speed line and the high-speed line interface associated therewith with a standby high-speed line and a standby high-speed line interface.

The problem with the conventional high-speed line interface is that it lacks a function of detecting errors occurred in itself. It is likely, therefore, that the conventional high-speed line interface is prevented from being accurately replaced with a stand-by interface when an error occurs therein.

BRIEF SUMMARY OF THE INVENTION

Object of the Invention

It is therefore an object of the present invention to provide a high-speed line interface capable of detecting not only an error occurred on a corresponding high-speed line but also an error occurred in itself.

Summary of the Invention

The present invention provides a line terminal for a high-speed line which sends input data to be transmitted and a transmission frame sync signal to a high-speed line after multiplexing them, outputs received data by removing a reception frame sync signal from a signal received from the line, and detects an error occurred on the line or in itself.

The line terminal of the present invention receives data to be transmitted which a multiplex-demultiplex circuit of multiplex equipment of a data transmission system has outputted to sent it to one high-speed line. The data to be transmitted is multiplexed by a first multiplex circuit (MUX) with a transmission frame sync signal generated by a frame generator and then sent out to the high-speed line as a signal to be transmitted. On the other hand, a received signal, i.e., multiplexed received data and reception frame sync signal received over the high-speed line are applied to a second MUX. The second MUX multiplexes the received signal from the line and the signal to be transmitted fed from the first MUX and then feeds them to a demultiplex circuit (DMUX). A frame sync circuit detects the transmission and reception frame sync signals from the output signal of the second MUX to synchronize itself to the two different frames, while outputting a timing signal of the reception frame sync signal. When the frame sync circuit cannot synchronize to either one of the two frames, it produces a frame error signal. The DMUX separates the signal from the second MUX into data to be transmitted produced by removing the transmission frame sync signal from the signal to be transmitted, and received data produced by removing the reception frame sync signal from the received signal. The received data is transferred from the DMUX to the multiplex-demultiplex circuit of the multiplex equipment. The DMUX determines the position of the reception frame sync signal which should be removed from the received signal by using the timing signal fed thereto from the frame sync circuit. The data to be transmitted from the DMUX is fed to a pattern comparator to be compared with the data to be transmitted which is applied to the first MUX. When the two data to be transmitted are not identical, the pattern comparator outputs a non-coincidence signal. The frame error signal indicates that an error has occurred on the high-speed line or in the line interface, while the non-coincidence signal indicates that an error has occurred in the line terminal.

Preferably, to match the two data to be transmitted applied to the pattern comparator with respect to phase, a buffer delays the data to be transmitted fed to the first MUX before the data is applied to the pattern comparator.

Preferably, a line driver sends the signal to be transmitted fed from the first MUX to the high-speed line, while a line receiver delivers a signal coming in through the line to the second MUX.

Preferably, an alarm generator generates an alarm signal in response to the frame error signal from the frame sync circuit or the non-coincidence signal from the pattern comparator.

The frame error signal is preferably implemented as a transmission frame error signal which the frame sync circuit generates when not detected the transmission frame sync signal or a reception frame sync signal which it generates when not detected the reception frame sync signal.

In an alternative embodiment of the present invention, a first MUX multiplexes data to be transmitted and a transmission frame sync signal to produce a signal to be transmitted. A third MUX multiplexes the signal to be transmitted with an additional pattern generated by a pattern generator and then transfers the multiplexed signal to a second MUX. The second MUX multiplexes the signal from the third MUX with a signal received over a high-speed line. A frame sync circuit synchronizes itself to the two frames included in an output signal of the second MUX and, when failed to synchronize to either one of the two frames, outputs a frame error signal, while producing a timing signal of a reception frame sync signal. A DMUX separates the signal from the second MUX into data to be transmitted, additional pattern and received data by using the timing signal from the frame sync circuit. The received data is transferred to a multiplex-demultiplex circuit of multiplex equipment. A first pattern comparator compares the data to be transmitted outputted by the DMUX with the data to be transmitted fed to the first MUX and, if they are not identical, outputs a data non-coincidence signal. A second pattern comparator compares the additional pattern generated by the DMUX with the additional pattern from the pattern generator and, if they are not identical, outputs a pattern non-coincidence signal.

Preferably, a buffer delays the additional pattern generated by the pattern generator and then applies it to the second pattern comparator in order to match the two additional patterns to be applied to the second pattern comparator with respect to phase.

Desirably, an alarm generator generates an alarm signal in response to the frame error signal from the frame sync circuit, the data non-coincidence signal from the first pattern comparator, or the pattern non-coincidence signal from the second pattern generator.

BRIEF DESCRIPTION OF THE DRAWINGS

The above-mentioned and other objects, features and advantages of the present invention will become more apparent from the following detailed description of the invention taken in conjunction with the accompanying drawings, wherein.

DETAILED DESCRIPTION OF THE PREFERRED EMBODIMENTS

Figure 1:
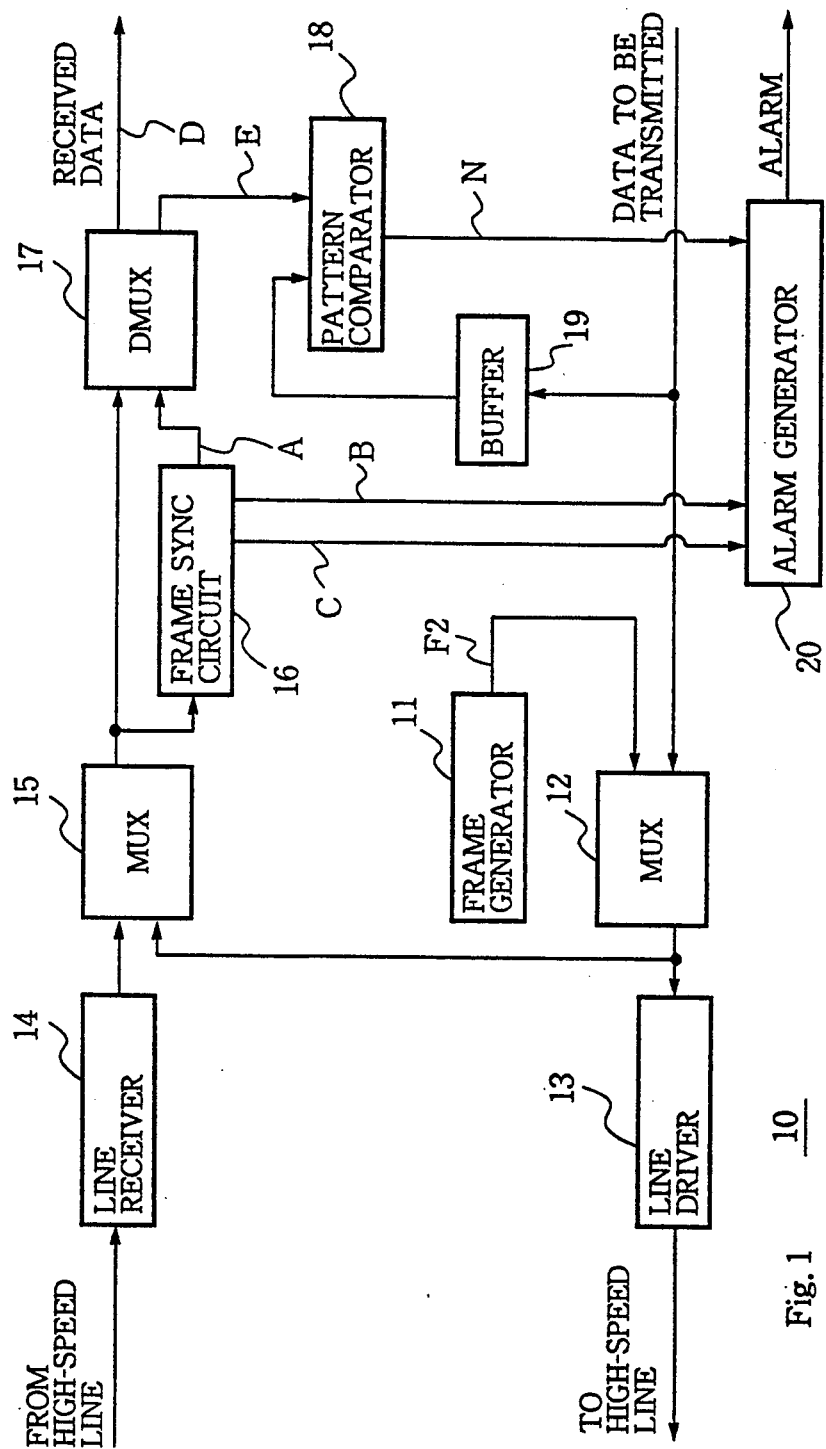
FIG. 1 is a schematic block diagram showing a line interface for a high-speed line embodying the present invention.

Referring to FIG. 1 of the drawings, a line terminal 10 for a high-speed line embodying the present invention is shown and includes a first multiplex circuit (MUX) 12. A multiplex-demultiplex circuit of multiplex equipment included in a data transmission system produces data to be transmitted over a high-speed line and applies it to the first MUX 12. In response, the MUX 12 multiplexes a transmission frame sync signal F2 with the data to be transmitted and then sends out the resulted multiplex signal to a high-speed line. A second MUX 15 receives a signal coming in over the high-speed line. A demultiplex circuit (DMUX) 17 removes a reception frame sync signal from the received signal to transfer only the received data to the multiplex-demultiplex circuit of the multiplex equipment.

The data to be transmitted applied to the line terminal 10 is formatted in frames. A frame generator 11 generates a transmission frame sync signal F2 at the frame period of data to be transmitted. The first MUX 12 multiplexes the transmission frame sync signal F2 with the data to be transmitted and feeds the resulted signal to a line driver 13 as a signal to be transmitted. The line driver 13 is a conventional circuit for sending the signal from the MUX 12 to the high-speed line.

A line receiver 14 also implemented with a conventional construction equalizes a signal from the high-speed line and delivers to the second MUX 15 a signal (received signal) having a reception frame sync signal multiplexed with received data. The MUX 15 multiplexes the signal to be transmitted fed from the MUX 12 and the received signal from the line receiver 14 and feeds the resulted signal to a frame sync circuit 16 and the DMUX 17. The frame sync circuit 16 detects the transmission frame sync signal and the reception frame sync signal out of the multiplexed signal fed from the MUX 15, thereby synchronizing itself to the frame of the signal to be transmitted and that of the received signal. At the same time, the frame sync circuit 16 delivers the timing signal A of the reception frame sync signal to the DMUX 17. When the frame sync circuit 16 does not detect any reception frame sync signal, it feeds a reception frame error signal B to an alarm generator 20. Also, when the frame sync circuit 16 does not detect a transmission frame sync signal F2, it delivers a transmission frame error signal C to the alarm generator 20. The DMUX 17 receives the received signal and the signal to be transmitted from the MUX 15 and the timing signal A from the frame sync circuit 16. In response, the DMUX 17 removes the reception frame sync signal from the received signal and removes the transmission frame sync signal F2 from the signal to be transmitted, thereby outputting received data D and data to be transmitted E. The DMUX 17 locates the reception frame sync signal to be removed from the received signal by using the timing signal A which is fed thereto from the frame sync circuit 16. The received data D from the DMUX 17 is transferred to the multiplex-demultiplex circuit of the multiplex equipment.

The data to be transmitted E from the DMUX 17 is applied to a pattern comparator 18. The data to be transmitted fed to the MUX 12 is delayed by a buffer 19 and then applied to the pattern comparator 18 with the phase thereof matched to the phase of the data E. The pattern comparator 18 compares the two data to be transmitted and, when they are not idential, delivers a data non-coincidence signal N to the alarm generator 20. The alarm generator 20 generates an alarm signal in response to the data non-coincidence signal N from the pattern comparator 18 or the reception frame error signal B or the transmission frame error signal C from the frame sync circuit 16.

When an error occurs on the high-speed line, the reception frame sync signal disappears from the received signal. Then, the frame sync circuit 16 fails to set up frame synchronization to the received signal which is included in the output of the MUX 15. As a result, the frame sync circuit 16 generates a reception frame error signal B to cause the alarm generator 20 to generate an alarm signal. When the transmission frame sync signal F2 disappears from the signal to be transmitted due to an error of the frame generator 11, the frame sync circuit 16 generates a transmission frame error signal C. Assume that data to be transmitted has disappeared in the MUX 12 although the transmission frame sync signal F2 is correctly multiplexed with the signal to be transmitted. In response to this kind of error, the pattern comparator 18 outputs the data non-coincidence signal N. Further, when an error occurs in any section of the line interface 10 except for the line driver 13 and alarm generator 20, at least one of the reception frame error signal B, transmission frame error signal C and data non-coincidence signal N appears to cause the alarm generator 20 to generate an alarm signal. In this manner, an error occurred on the high-speed line or in the line interface 10 itself can be detected on the basis of an alarm signal which the alarm generator 20 produces.

The alarm signal generated by the alarm generator 20 is used as a trigger for requesting the replacement of one or both of the line interface 10 and associated high-speed line with a standby line interface and a standby high-speed line.

It is noteworthy that the location where an error has occurred can be estimated to a certain degree on the basis of the signal generated, i.e., the reception frame error signal B, the transmission frame error signal C or the data non-coincidence signal N.

Figure 2:
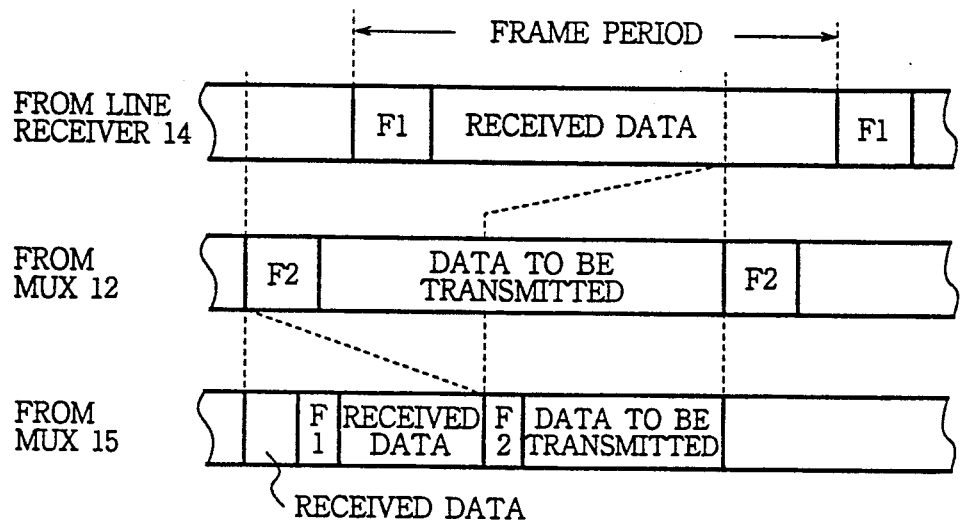
FIG. 2 is a timing chart representative of the operation of a MUX included in the embodiment.

As shown in FIG. 2, the received signal transferred from the line receiver 14 to the MUX 15 is a multiplexed signal of reception frame sync signal F1 and received data. The signal to be transmitted applied from the MUX 12 to the MUX 15 is a multiplexed signal of transmission frame sync signal F2 and data to be transmitted. The received signal and the signal to be transmitted are the same in frame period, but they are not synchronous in frame phase. The MUX 15 multiplexes the input received signal and signal to be transmitted without matching their frame phases. Namely, the MUX 15 multiplexes the received signal and the signal to be transmitted such that received signals inputted at the frame period of the signals to be transmitted appear before the corresponding frames of the signals to be transmitted. Hence, the timing indicative of the border between the received signal and the signal to be transmitted in the signal which the MUX 15 delivers to the frame sync circuit 16 and DMUX 17 is known beforehand. Also, the position of the signal to be transmitted where the transmission frame sync signal F2 is inserted is known since the signal F2 is multiplexed with data to be transmitted by the MUX 12. However, the MUX 15 does not know the position of the received signal where the received frame sync signal F1 is inserted.

Figure 3:
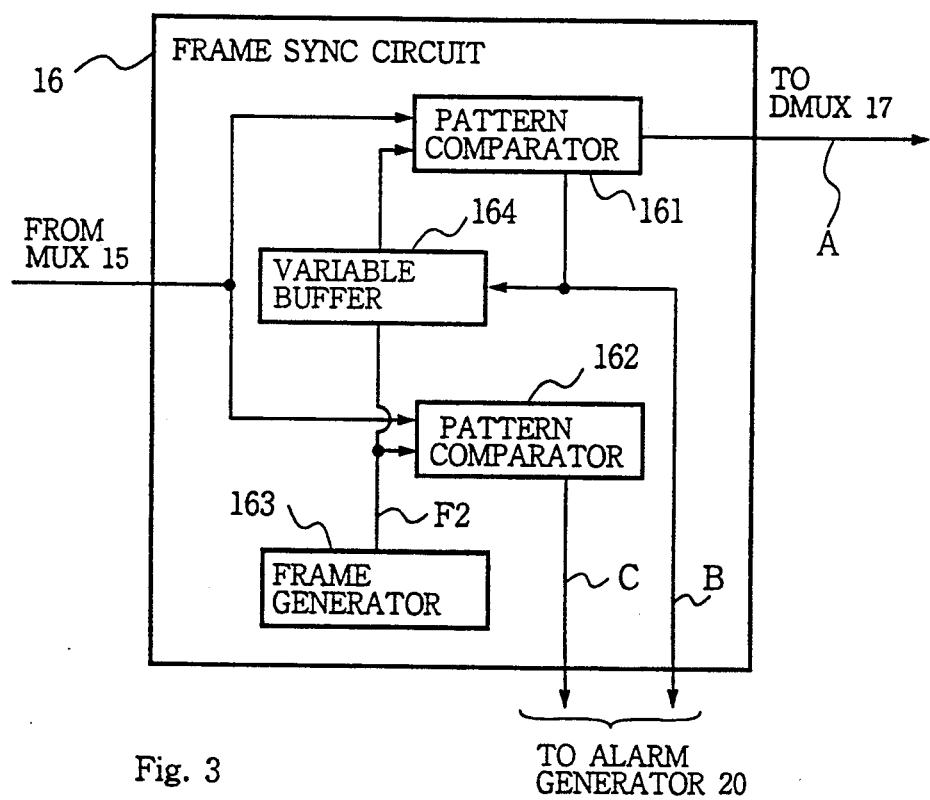
FIG. 3 is a block diagram schematically showing a frame sync circuit included in the embodiment.

FIG. 3 shows a specific construction of the frame sync circuit 16. In FIG. 3, the output signal of the MUX 15 is fed to a first and a second pattern comparator 161 and 162, respectively. A frame generator 163 generates a transmission frame sync signal F2 in a phase matching the transmission frame sync signal F2 which is generated by the frame generator 11 and routed through the MUXs 12 and 15 to the frame sync circuit 16. This frame sync signal F2 is applied to the pattern comparator 161 via a variable buffer 164 and is applied directly to the pattern comparator 162.

At the timing of the frame sync signal F2 from the frame generator 163, the pattern comparator 162 compares the output signal of the MUX 15 and the frame sync signal F2 so as to detect the signal F2 from the output signal of the MUX 15, thereby setting up synchronization to the frame of the signal to be transmitted. When the result of comparison is non-coincidence, i.e., when the pattern comparator 162 fails to detect the frame sync signal F2 from the output signal of the MUX 15, it generates a transmission frame error signal C and delivers it to the alarm generator 20.

While the transmission frame sync signal F2 and the reception frame sync signal F1 which are included in the output of the MUX 15 are different in phase, they have an identical pattern which repeats at the period of a plurality of frames such as twenty-four frames. The variable delay range of the variable buffer 164 is selected such that the phase of the frame sync signal F2 passed through the variable buffer 164 can be matched to the phase of any time slot of twenty-four frames of received signal included in the output of the MUX 15 (see FIG. 2) and cannot be matched to any of the time slots of the signal to be transmitted. In response to the frame sync signal F2 from the variable buffer 164, the pattern comparator 161 compares the output of the MUX 15 and the frame sync signal F2 and, if the result of comparison is non-coincidence, delivers a reception frame error signal B to the variable buffer 164 and alarm generator 20. In response, the variable buffer 164 varies the delay time by one time slot of the output of the MUX 15. Then, the pattern comparator 161 again compares the two input signals. If the output of the MUX 15 contains the reception frame sync signal F1 correctly, the result of comparison by the pattern comparator 161 will necessarily become coincidence while the variable buffer 164 sequentially changes the delay time within the variable range. Every time the pattern comparator 161 determines that the two input signals are identical, it feeds the timing signal A of the frame sync signal F1 to the DMUX 17. Even after the variable buffer 164 has varied the delay time over the entire variable range, the pattern comparator 161 continuously produces the reception frame error signal B so long as the result of comparison is non-coincidence.

A specific structure of the DMUX 17 will be described with reference to FIG. 4. As shown, the output signal of the MUX 15 and the timing signal A outputted by the first pattern comparator 161 are applied to a selector 171 included in the DMUX 17. The selector 171 separates only the received data from the output of the MUX 15 (see FIG. 2) and transfers it to a buffer 172 and, at the same time, separates only the data to be transmitted and transfers it to a buffer 173. The timing indicative of the border between the received signal and the signal to be transmitted in the output of the MUX 15 is known beforehand, as stated earlier. Also, the position where the reception frame sync signal F1 is indicated by the timing signal A fed from the frame sync circuit 16. Hence, the selector 171 performs the above-stated separation by using such timing information. One frame of received data D is sequentially read out of the buffer 172 over one frame period and sent to the multiplex-demultiplex circuit of the multiplex equipment. Further, one frame of data to be transmitted E is sequentially read out of the buffer 173 and transferred to the pattern comparator 18.

It may occur that the data E being transferred from the DMUX 17 to the pattern comparator 18 is fixed at either "1" or "0" with no regard to the data to be transmitted being fed to the MUX 12, due to an error of the MUX 15 or an error of the selector 171 included in the DMUX 17. Assume that this kind of error has occurred in the MUX 15 or the DMUX 17 while the data to be transmitted and being applied to the MUX 12 is a string of "0" or "1", although such an occurrence is rare. Then, the line interface 10 practically fails to detect such an error. An alternative embodiment of the present invention which will be described with reference to FIG. 5 is capable of detecting even this kind of error.

Figure 6:
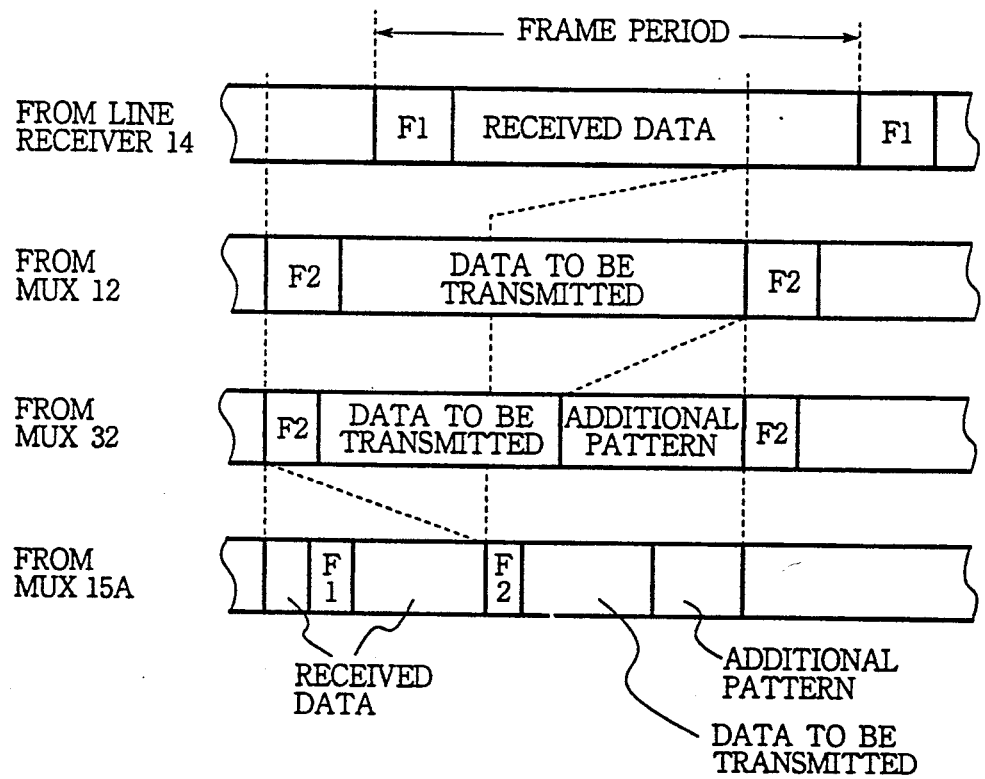
FIG. 6 is a timing chart demonstrating the operations of MUXs included in the alternative embodiment.
Figure 5:
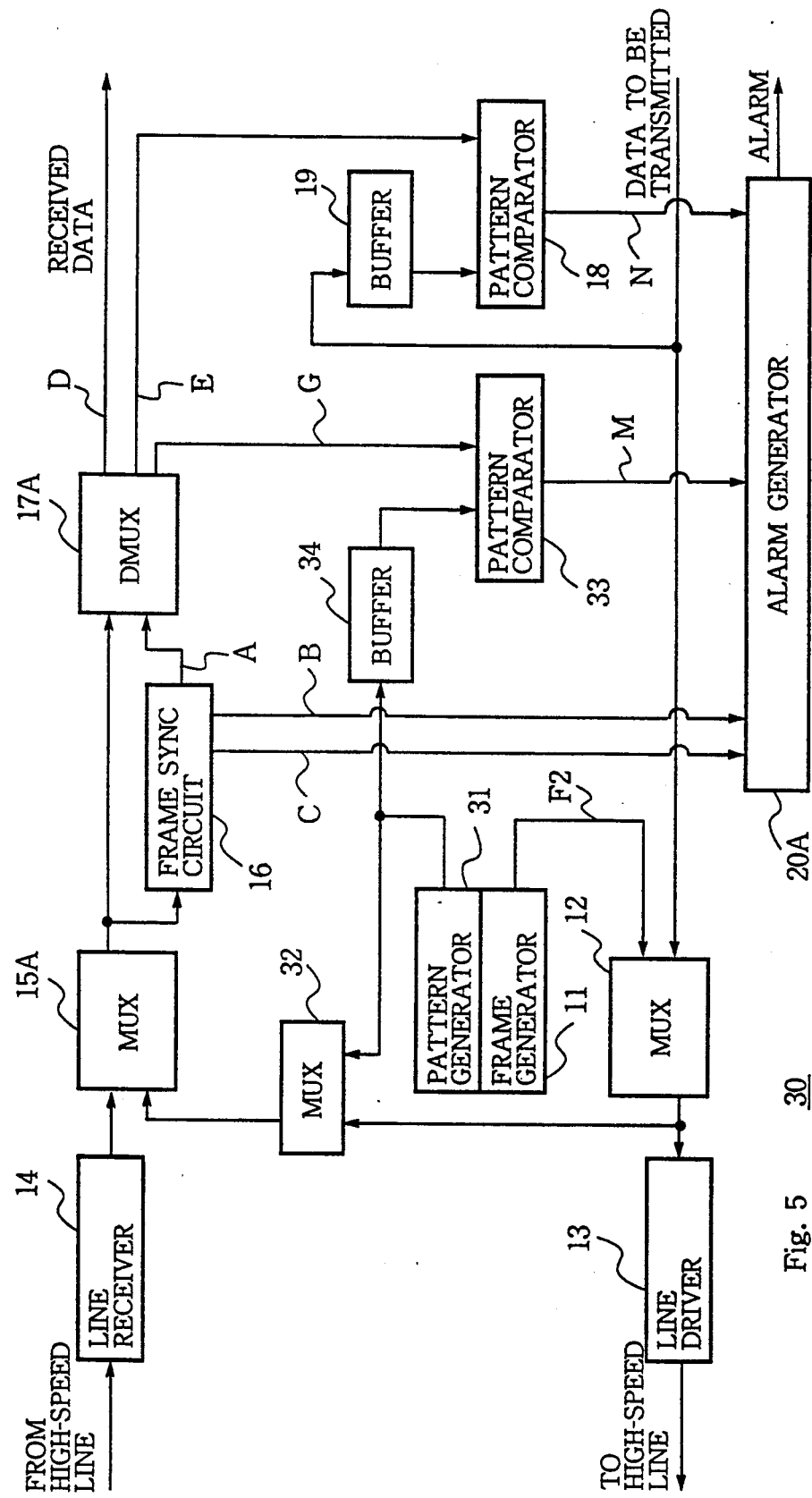
FIG. 5 is a block diagram schematically showing an alternative embodiment of the present invention.

Referring to FIG. 5, a line interface, generally 30, has a pattern generator 31, a third MUX 32, a second pattern comparator 33, and a second buffer 34 in addition to the components of the line terminal 10, FIG. 1. The pattern generator 31 generates a pseudo-random pattern or similar additional pattern which repeats at the frame frequency of data to be transmitted and is highly random. As shown in FIG. 6, the third MUX 32 outputs the additional pattern from the pattern generator 31 by multiplexing it with a signal to be transmitted from the first MUX 12. A second MUX 15A multiplexes the output signal of the third MUX 32 and the received signal from the line receiver 14 without matching their frame phases. More specifically, the second MUX 15A multiplexes the two signals such that the received signals inputted at the frame period of the output signal of the third MUX 32 precede the corresponding frames of the latter. The frame sync circuit 16 detects the transmission frame sync signal F2 and the reception frame sync signal F1 from the output signal of the second MUX 15A to in turn output the timing signal A of the signal F1. The frame sync circuit 16 outputs the reception frame error signal B when it does not detect any reception frame sync signal or outputs the transmission frame error signal C when it does not detect any transmission frame sync signal.

Figure 4:
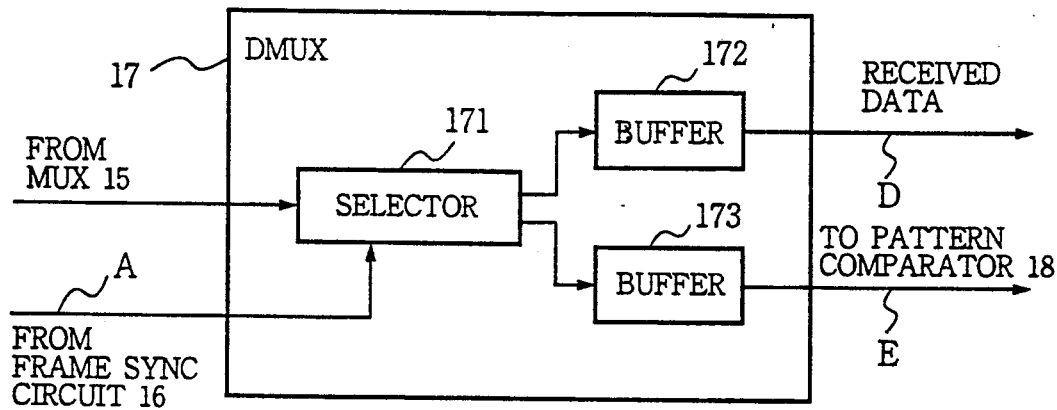
FIG. 4 is a schematic block diagram showing a DMUX included in the embodiment.

A DMUX 17A is made up of a selector corresponding to the selector 171 of the DMUX 17, FIG. 4, two buffers corresponding to the buffers 172 and 173, and another buffer assigned to the additional pattern. By using the timing signal A from the frame sync circuit 16, the selector separates the received data, data to be transmitted and additional pattern from the output signal of the second MUX 15A and delivers them to their associated buffers. Received data D read out of the buffer assigned to received data is sent to the multiplex-demultiplex circuit of the multiplex equipment, while data to be transmitted E read out of the buffer assigned to data to be transmitted is transferred to the pattern comparator 18. Additional bits G read out of the buffer to which additional bits were inputted are transferred to the second pattern comparator 33. The additional pattern generated by the pattern generator 31 is fed to the buffer 34 as well. The buffer 34 delays the additional pattern and then delivers it to the pattern comparator 33 while matching it in phase to the addiitonal pattern G fed from the DMUX 17A. The pattern comparator 33 compares the two additional patterns and, on detecting non-coincidence, outputs a pattern non-coincidence signal M.

The pattern non-coincidence signal M from the second pattern comparator 33, the reception frame error signal B and transmission frame error signal C from the frame sync circuit 16 and the data non-coincidence signal N from the pattern comparator 18 are applied to an alarm generator 20A. The alarm generator 20A generates an alarm signal in response to any one of such signals B, C, N and M.

The line interface 30 shown in FIG. 5 has the pattern generator 11, MUX 12, line driver 13, line receiver 14, pattern comparator 18, and buffer 19 in addition to the circuitry described above, i.e., all of the functions of the line interface 10, FIG. 1.

The data to be transmitted inputted to the first MUX 12 is multiplexed with the transmission frame sync signal F2 by the MUX 12, multiplexed with the additional pattern by the third MUX 32, multiplexed with the received signal by the second MUX 15A, separated by the DMUX 17A, and then applied to the pattern comparator 18.

Assume that an error has occurred in the second MUX 15A or the selector of the DMUX 17A to fix the data to be transmitted E and being transferred from the DMUX 1&A to the pattern comparator 18 at "1" or "0" with no regard to the data to be transmitted being applied to the first MUX 12, and that the data being applied to the MUX 12 is a string of "1" or "0". Then, the pattern comparator 18 does not output a data non-coincidence signal N despite that an error has occurred. Nevertheless, the additional pattern G separated by the DEMUX 17A and fed to the second pattern comparator 33 is also fixed at "1" or "0". On the other hand, the additional pattern fed from the pattern generator 31 to the pattern comparator 33 via the buffer 34 is highly random. Hence, the two additional patterns applied to the pattern comparator 33 do not compare equal with the result that the pattern comparator 33 outputs a pattern non-coincidence signal M. Consequently, the alarm generator 20A generates an alarm signal to allow the above-stated error to be detected.

In summary, it will be seen that the present invention provides a line interface for a high-speed line which is capable of detecting not only an error occurred on the high-speed line but also an error occurred in itself. For this purpose, the line interface multiplexes a signal to be transmitted with a received signal and sets up frame synchronization to the multiplexed signal to thereby confirm frame synchronization not only to the received signal but also to the signal to be transmitted; data to be transmitted and separated from the multiplexed signal and the original data to be transmitted are checked for coincidence.

For surer detection of an error of the line interface, not only the signal to be transmitted but also an additional pattern may be multiplexed with the received signal so as to check an additional pattern separated from the multiplexed signal and the original additional pattern for coincidence.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any modifications or embodiments as fall within the true scope of the invention.

What is claimed is:

1. A line interface for a communication line, comprising:
input means for providing a data to be transmitted signal;
means for combining said data to be transmitted signal with a transmission frame synchronizing (sync) signal to provide a combined signal of said data to be transmitted signal with said frame sync signal;

means for sending said combined signal of said data to be transmitted signal with said frame sync signal to a communication line;

means for receiving a received signal from the communication line;

means for producing a multiplexed signal by multiplexing said received signal and said combined signal of said data to be transmitted signal with said frame sync signal;

means for processing said multiplexed signal to output data included in said received signal;

means for separating from said multiplex signal said data to be transmitted signal included in said multiplexed signal forming a separated data to be transmitted signal; and means for comparing said data to be transmitted signal and said separated data to be transmitted signal.

2. A line interface as claimed in claim 1, further comprising means for detecting in said multiplexed signal a frame error in said combined signal of said data to be transmitted and said transmission frame sync signal.

3. A line interface as claimed in claim 1, further comprising means responsive to said multiplexed signal for producing a frame signal indicative of frame synchronization of said received signal, and means for applying said frame signal to said processing means.

4. A line interface as claimed in claim 2, further comprising means responsive to said multiplexed signal for detecting a frame error in said received signal.

5. A line interface as claimed in claim 2, further comprising:

means for generating data having a predetermined pattern;

said means for producing a multiplexed signal multiplexing with said received signal and said combined signal of said data to be transmitted signal with said frame sync signal, said data having said pattern;

means for separating said data of said pattern from said multiplexed signal; and means for comparing said data of said pattern from said generating means and said data of said pattern from said separating means to determine if said data of said pattern from said generating means and said data of said pattern from said separating means are identical.

6. A line interface as claimed in claim 2, wherein said detecting means comprises means or matching phases of said said data of said pattern from said generating means and said data of said pattern from said separating means.

7. A line interface as claimed in claim 5, wherein said detecting means comprises means for matching phases of said said data of said pattern from said generating means and said data of said pattern from said separating means.

8. A line interface as claimed in claim 1, wherein said sending means comprises a line driver.

9. A line interface as claimed in claim 1, wherein said receiving means comprises a line receiver.

10. A line interface for a high-speed line, comprising:

first means for receiving data to be transmitted to a high-speed line;

a frame generator for generating a transmission frame sync signal to be added to said data to be transmitted;

a first multiplex circuit connected to said first means and said frame generator for receiving said data to be transmitted and said transmission frame sync signal from said first means and said frame generator, respectively, and multiplexing said data to be transmitted and said transmission frame sync signal to produce a transmit signal that is to be transmitted;

second means for sending said transmit signal to the high-speed line;

third means for receiving a received signal from the high-speed line;

a second multiplexer connected to said first multiplexer and to said third means for receiving said transmit signal from said first multiplexer and said received signal from said third means, and multiplexing said said transmit signal and said received signal to produce a multiplexed signal;

a frame sync circuit for detecting said transmission frame sync signal and a reception frame sync signal included in said received signal out of said multiplexed signal outputted by said second multiplexer, said frame sync circuit outputting a timing signal of said detected reception frame sync signal, and outputting a frame error signal when said frame sync circuit does not detect said transmission frame sync signal or said reception frame sync signal;

a demultiplex circuit for receiving said multiplexed signal and said timing signal respectively outputted by said second multiplex circuit and said frame sync circuit, said demultiplexing circuit processing said multiplexed signal on the basis of said timing signal to output received data produced by removing said reception frame sync signal from said received signal and to output a data to be transmitted component included in said multiplexed signal, and pattern comparing means for comparing said data to be transmitted component and outputted by said demultiplexer with said data to be transmitted fed from said first means to said first multiplexer and, when said data to be transmitted component is not identical to said data to be transmitted fed from said first means to said first multiplexer, outputting a non-coincidence signal.

11. A line interface as claimed in claim 10, wherein said pattern comparing means comprises a buffer for delaying said data to be transmitted and fed from said first means so as to match data in phase with said data to be transmitted outputted by said demultiplex circuit.

12. A line interface as claimed in claim 10, wherein said second means comprises a line driver for receiving said transmit signal to be transmitted and fed from said transmit first multiplexer and sending said transmit signal to the high-speed line.

13. A line interface as claimed in claim 12, wherein said third means comprises a line receiver for receiving said received signal from the high-speed line and delivering said receiving signal to said second multiplex circuit.

14. A line interface as claimed in claim 10, further comprising an alarm generator for producing an alarm signal in response to at least one of said frame error signal from said frame sync circuit and said non-coincidence signal from said pattern comparator.

15. A line interface as claimed in claim 10, wherein said frame sync circuit outputs a transmission frame error signal when not detected said transmission frame sync signal or a reception frame error signal when not detected said reception frame sync signal.

16. A line interface for a high-speed line, comprising:

a frame generator for generating a transmission frame sync signal;

a first multiplex circuit for receiving data to be transmitted to a high-speed line and said transmission frame sync signal and multiplexing said data to be transmitted and said transmission frame sync signal to output a transmission signal that is to be transmitted;

a pattern generator for generating a predetermined pattern;

a second multiplex circuit for multiplexing said pattern from said pattern generator and said transmission signal from said first multiplex circuit to produce a multiplexed signal;

a third multiplex circuit for multiplexing said multiplexed signal from said second multiplex circuit with a received signal received from the high-speed line;

a frame sync circuit for detecting said transmission frame sync signal and a reception frame sync signal included in said received signal out of a signal outputted by said third multiplex circuit and thereby producing a timing signal of said received frame sync signal, said frame sync circuit outputting a frame error signal when said transmission frame sync signal or said reception frame sync signal is not detected;

a demultiplex circuit for processing output signal of said third multiplex circuit in response to said timing signal outputted by said frame sync circuit to output received at a produced by removing said reception frame sync signal from said received signal, said data to be transmitted, and said pattern;

first pattern comparing means for comparing said data to be transmitted outputted by said demultiplex circuit with said data to be transmitted inputted to said first multiplex circuit and, when said said data to be transmitted outputted by said demultiplex circuit is not identical to said data to be transmitted inputted to said first multiplex circuit, outputting a data non-coincidence signal; and second pattern comparing means for comparing said pattern outputted by said demultiplex circuit with said pattern fred from said pattern generator and, when said pattern outputted by said demultiplex circuit is not identical with said pattern fed from said pattern generator, outputting a pattern non-coincidence signal.

17. A line interface as claimed in claim 16, wherein said first pattern comparing means comprises a first buffer for delaying said data to be transmitted inputted to said first multiplex circuit to match said data in phase to said data to be transmitted outputted by said demultiplex circuit;

said second pattern comparing means comprising a second buffer for delaying said pattern outputted by said pattern generator to match said pattern in phase to said pattern outputted by said demultiplex circuit.

18. A line interface as claimed in claim 17, further comprising:

a line driver for receiving said transmit signal to be transmitted from said first multiplex circuit and sending said transmit signal to the high-speed line; and a line receiver for receiving said received signal from said high-speed line and delivering said received signal to said second multiplex circuit.

19. A line interface as claimed in claim 19, further comprising an alarm generator for generating an alarm signal in response to at least one of said frame error signal from said frame sync circuit, said data non-coincidence signal from said first pattern comparing means, and said pattern non-coincidence signal from said second pattern comparing means.

20. A line interface as claimed in claim 16, wherein said frame sync circuit outputs a transmission frame error signal when not detected said transmission frame sync signal or a reception frame error signal when not detected said reception frame sync signal.

* * * * *